(12) United States Patent
Kim et al.

(10) Patent No.: US 7,648,794 B2
(45) Date of Patent: Jan. 19, 2010

(54) LITHIUM SECONDARY BATTERY AND A CAP ASSEMBLY THEREFOR

(75) Inventors: Se Yun Kim, Youngin-si (KR); Sang Sok Jung, Youngin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 742 days.

(21) Appl. No.: 11/234,831

(22) Filed: Sep. 23, 2005

(65) Prior Publication Data

US 2006/0105228 A1    May 18, 2006

(30) Foreign Application Priority Data

Sep. 24, 2004   (KR)  ............... 10-2004-0077235

(51) Int. Cl.
*H01M 2/12* (2006.01)
(52) U.S. Cl. ............................................. 429/56
(58) Field of Classification Search ............. 429/56
See application file for complete search history.

(56) References Cited

U.S. PATENT DOCUMENTS

| | | | | |
|---|---|---|---|---|
| 2,525,436 A | * | 10/1950 | Williams, Jr. ............... | 429/56 |
| 4,256,812 A | * | 3/1981 | Tamura et al. ............... | 429/56 |
| 6,346,342 B1 | * | 2/2002 | Li ................................ | 429/56 |
| 6,432,572 B1 | * | 8/2002 | Yoshida et al. ............... | 429/56 |
| 2005/0181272 A1 | * | 8/2005 | Kim ........................... | 429/56 |

FOREIGN PATENT DOCUMENTS

JP    2000-348700    12/2000

OTHER PUBLICATIONS

Patent Abstracts of Japan for Publication No. 2000-348700; Date of publication of application Dec. 15, 2000, in the name of Azema Tadamitsu, et al.

* cited by examiner

*Primary Examiner*—Stephen J. Kalafut
(74) *Attorney, Agent, or Firm*—Christie, Parker & Hale, LLP

(57) ABSTRACT

A cap assembly and a lithium secondary battery with the same, in which a shape of a safety vent of a cap plate is such that the safety vent is easily fracturable under low pressure even if the safety vent has a relatively large thickness, thereby improving reliability and safety of the lithium secondary battery. The cap assembly cap plate has a safety vent including at least one first directional weak component and at least one second directional weak component which is connected to the first directional weak component.

12 Claims, 6 Drawing Sheets

LITHIUM SECONDARY BATTERY AND A CAP ASSEMBLY THEREFOR

CROSS-REFERENCE TO RELATED APPLICATION

This application claims the priority of Korean Patent Application No. 2004-0077235, filed on Sep. 24, 2004, in the Korean Intellectual Property Office, the entire content of which is incorporated herein by reference.

BACKGROUND OF THE INVENTION

1. Field of the Invention

The present invention relates to secondary batteries, and, more particularly, to a modified cap assembly plate for a lithium secondary battery providing improved reliability and safety characteristics.

2. Description of the Prior Art

Recently, electronic appliances having compact sizes and light weight, such as cellular phones, notebook computers and camcorders, have been actively developed and produced. Such electronic appliances are equipped with battery packs so that users can use the electronic appliances in various places even if electric power sources are not separately provided for the electronic appliances. The battery pack includes at least one bare cell capable of outputting an operational voltage having a predetermined level in order to operate the electronic appliance for a predetermined period of time.

Secondary batteries, which are rechargeable batteries, are currently employed in the secondary pack due to their economical advantages. Secondary batteries include Ni—Cd batteries, Ni-MH batteries and Li secondary batteries, such as Li batteries or Li-ion batteries.

In particular, lithium secondary batteries have an operational voltage of about 3.6V, which is three times higher than that of Ni—Cd batteries or Ni-MH batteries used as power sources for the portable electronic appliances. In addition, lithium ion secondary batteries have high energy density per unit weight so they are extensively used in the advanced electronic technology fields.

Lithium secondary batteries typically use lithium-based oxide as a positive electrode active material and carbon as a negative electrode active material. In general, lithium batteries are classified into liquid electrolyte batteries or polymer electrolyte batteries according to the kind of the electrolytes used therefor. Liquid electrolyte batteries are called "lithium ion batteries" and polymer electrolyte batteries are called "lithium polymer batteries." In addition, lithium secondary batteries may be fabricated with various shapes, such as cylinder type lithium secondary batteries, square type lithium secondary batteries, or pouch type lithium secondary batteries.

Typically, lithium ion secondary batteries include an electrode assembly having a positive electrode plate coated with a positive electrode active material, a negative electrode plate coated with a negative electrode active material and a separator interposed between the positive electrode plate and the negative electrode plate for preventing a short circuit while allowing the movement of lithium-ions exclusively. Lithium ion secondary batteries also typically include a case for receiving the electrode assembly and an electrolyte contained in the case in order to enable lithium-ions to move.

In such a lithium ion secondary battery, the positive electrode plate coated with the positive electrode active material is connected to a positive electrode tap and the negative electrode plate coated with the negative electrode active material is connected to a negative electrode tap. The positive electrode plate and the negative electrode plate are stacked with the separator therebetween and wound in the form of a jelly roll, thereby forming the electrode assembly. The positive electrode active material is composite oxide including lithium (Li). Typically, the positive electrode active material includes $LiCoO_2$, which is obtained by mixing lithium carbonate and cobalt oxide in a ratio of about 1.2:1 and performing a plastic process under the temperature of between about 400 to 1000° C.

The electrode assembly is then accommodated in the case and a cap assembly is sealed to an upper end of the case in order to prevent the electrode assembly from separating from the case.

After sealing the cap assembly to the upper end of the case, the electrolyte is injected into the case and an electrolyte injection hole formed in the case is sealed, thereby providing the lithium ion secondary battery.

As shown in FIGS. 1A and 1B, the cap assembly includes a conventional cap plate 100 formed with a safety vent 110 for preventing accidental explosion of the lithium ion secondary battery caused by high internal pressure of the battery from gas generated during the charge operation of the lithium ion secondary battery. When the internal pressure of the lithium ion secondary battery reaches an unsafe level, the safety vent 110 fractures to allow gas contained in the lithium ion secondary battery to be discharged to the exterior, thereby ensuring the safety of the battery.

However, the safety vent 110 of the above lithium ion secondary battery has a thickness of about 20 μm, which is significantly smaller than the thickness (about 0.8 mm) of the cap plate 100, so the safety vent 110 may fracture even if external pressure is accidentally applied thereto, for example, when the lithium ion secondary battery is dropped.

Such a breakage of the safety vent 110 caused by external pressure may lead to leakage of the electrolyte contained in the lithium ion secondary battery, thereby degrading the safety of the lithium ion secondary battery.

SUMMARY OF THE INVENTION

Accordingly, a cap assembly, and a lithium secondary battery incorporating the cap assembly, is provided in which the shape of a safety vent of a cap plate is modified such that the safety vent may be easily fractured under low pressure even if the safety vent has a relatively large thickness, thereby improving the reliability and safety of the lithium secondary battery.

The cap assembly includes a planar cap assembly plate having a safety vent located within the planar plate, the safety vent having a safety vent thickness adapted to fracture upon the secondary battery reaching a predetermined internal pressure, the safety vent being formed by at least one first weak component aligned in a first direction and at least one second weak component aligned in a second direction, wherein the second weak component is connected to the first weak component.

According to another embodiment of the present invention, the lithium secondary battery includes a roll-type electrode assembly having a first electrode plate, a second electrode and a separator interposed between the first and second electrode plates; a case having a cavity for receiving the electrode assembly therein; and a cap assembly having a cap plate formed with a safety vent including at least one first directional weak component and at least one second directional weak component which is connected to the first directional weak component while forming a predetermined angle therebetween. The cap assembly is assembled with the case in order to seal the case and is provided with a terminal unit electrically connected to the electrode assembly.

According to an exemplary embodiment of the present invention, the safety vent has a shape selected from an H-shape, a T-shape, an I-shape, a II-shape or III-shape.

The first directional weak component is aligned in a long-axis direction of the cap plate and the second directional weak component may be aligned in a short-axis direction of the cap plate.

One end of the second directional weak component of the safety vent may be connected to a center portion of the first directional weak component of the safety vent.

Both ends of at least one of the second directional weak component of the safety vent may be connected to center portions of at least two first directional weak components of the safety vent.

A length of the first directional weak component may be longer than a length of the second directional weak component. In contrast, it is also possible to set the length of the second directional weak component longer than the length of the first directional weak component.

In one exemplary embodiment, the safety vent has a thickness of between about 20 μm to 0.7 mm.

DETAILED DESCRIPTION

Figure 1A:
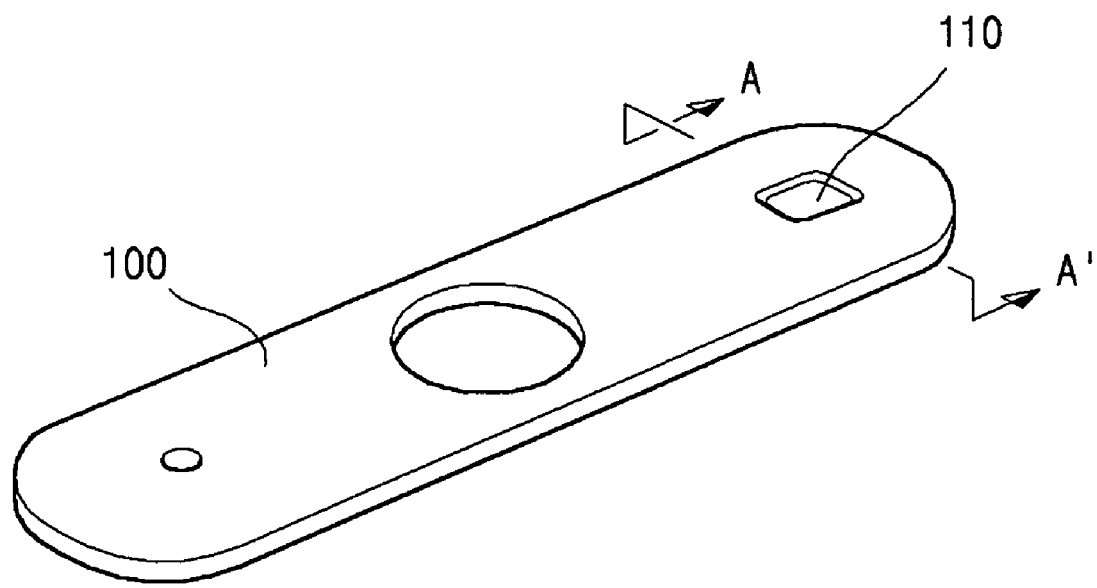
FIGS. 1A and 1B are views illustrating a conventional cap assembly.
Figure 1B:
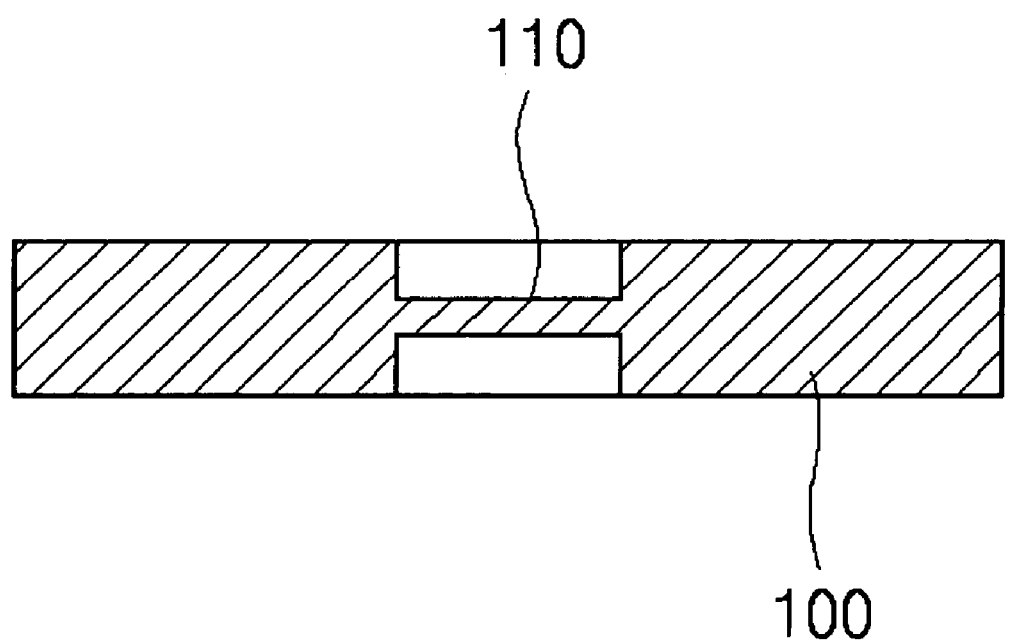
Figure 2:
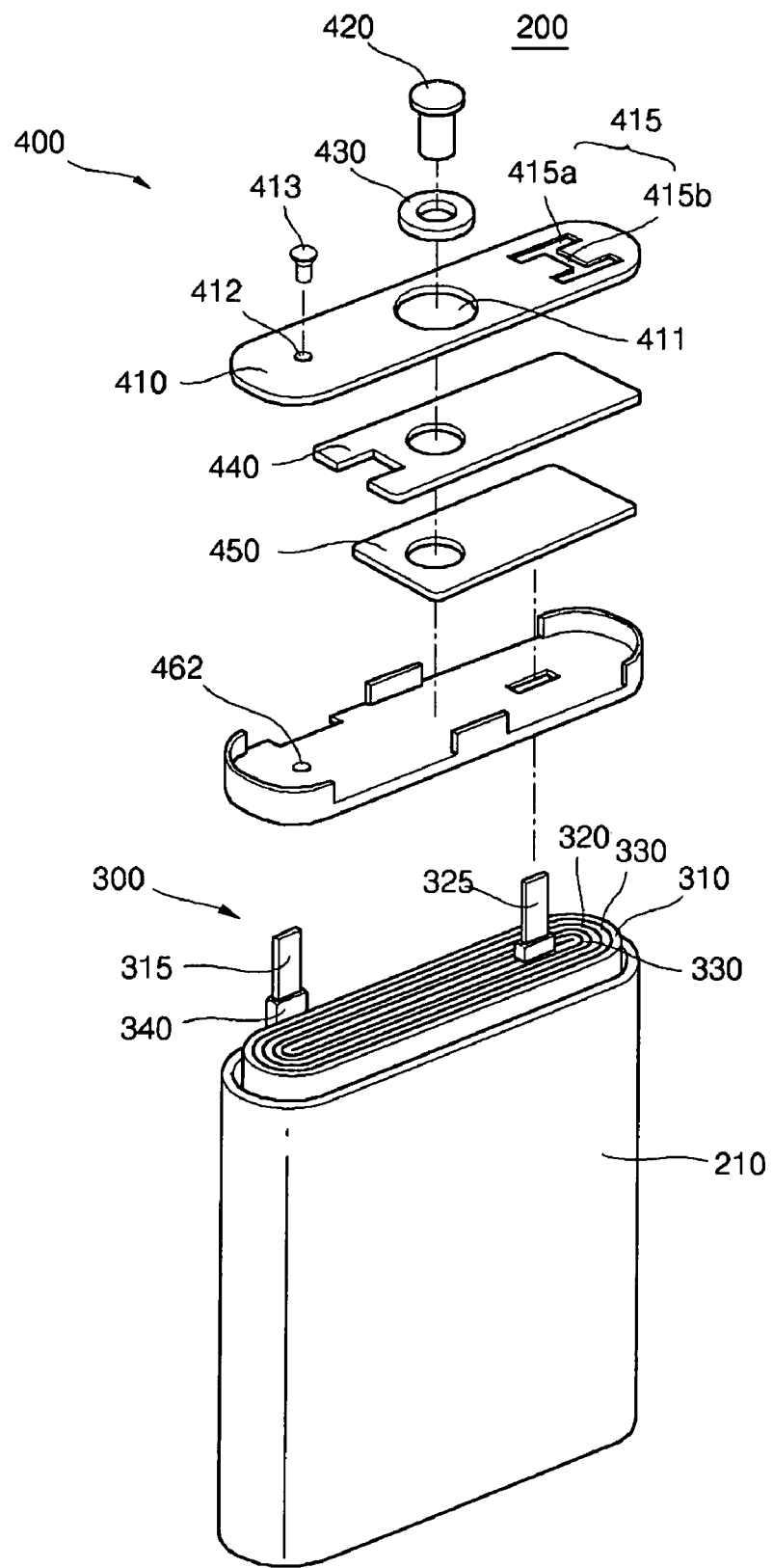
FIG. 2 is an exploded perspective view illustrating a lithium secondary battery according to one embodiment of the present invention.

Referring to FIG. 2, the lithium secondary battery 200 according to one embodiment of the present invention includes a case 210, a jelly roll type electrode assembly 300 accommodated in the case 210, and a cap assembly 400 assembled with an upper end of the case 210.

The case 210 is made from a metal can having a hexahedronal shape with an open upper portion and serves as a terminal. The electrode assembly 300 includes a first electrode plate 310 provided with either a first electrode tap 315 used as a positive electrode tape or a second electrode tap 325 used as a negative electrode tap, a second electrode plate 320 provided with either the first electrode tap 315 or the second electrode tap 325, and a separator 330 interposed between the first and second electrode plates 310 and 320. The first electrode plate 310, the second electrode plate 320 and the separator 330 are wound and accommodated in the case 210. Insulating tape 340 is attached around exposed portions of the first and second electrode taps 315, 325 to prevent a short circuit between the first and second electrode taps 315, 325.

The cap assembly 400 includes a flat plate type plate 410 having a shape and a size corresponding to that of an opening of the case 210. The cap plate 410 has a centrally located terminal hole 411 and is formed at one side thereof with an electrolyte injection hole 412 for injecting the electrolyte into the case 210. A ball 413 is inserted into the electrolyte injection hole 412 in order to seal the electrolyte injection hole 412. In addition, a safety vent 415 is formed at the side of the cap plate 410 opposite the electrolyte injection hole 412 in order to ensure the safety of the lithium secondary battery 200. The safety vent 415 includes at least one first directional weak component 415a and at least one second directional weak component 415b which is substantially perpendicular to the first directional weak component 415.

An electrode terminal 420, for instance, a negative electrode terminal, is inserted into the terminal hole 411. A tube-shaped gasket 430 is installed around the electrode terminal 420 in order to electrically insulate the electrode terminal 420 from the cap plate 410. An insulating plate 440 is provided below the cap plate 410 and a terminal plate 450 is provided below the insulating plate 440.

The electrode terminal 420, which is surrounded by the gasket 430, is inserted into the terminal hole 411. A lower portion of the electrode terminal 420 is electrically connected to the terminal plate 450 through the insulating plate 440.

The first electrode tap 315 protruding from the first electrode plate 310 is welded to a lower surface of the cap plate 410 and the second electrode tap 325 protruding from the second electrode plate 320 is welded to a lower portion of the electrode terminal 420.

An insulating case is provided at an upper surface of the electrode assembly 300 in order to electrically insulate the electrode assembly 300 from the cap assembly 400 while covering an upper end portion of the electrode assembly 300. The insulating case is formed with an electrolyte passage hole 462 aligned to the electrolyte injection hole 412 of the cap plate 410 so as to allow the electrolyte to be introduced into the case 210. The insulating case is made from polymer resin having superior insulating characteristics, for example, polypropylene. However, the present invention is not limited to such materials for the insulating case.

Figure 3A:
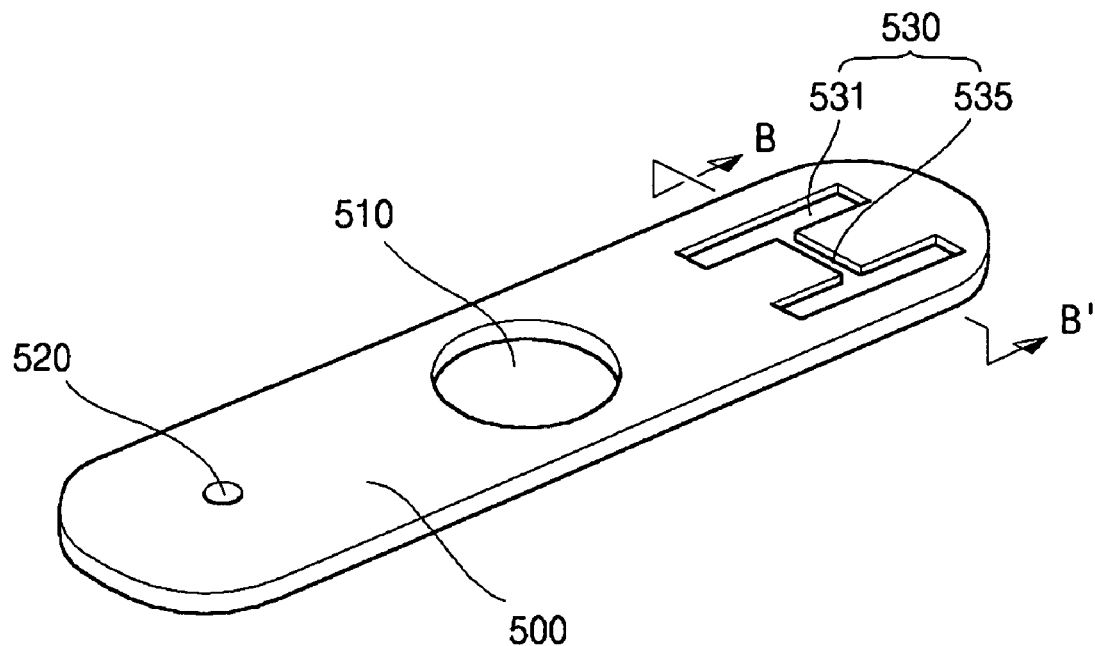
FIG. 3A is a perspective view illustrating a cap plate of a lithium secondary battery according to one embodiment of the present invention.
Figure 3B:
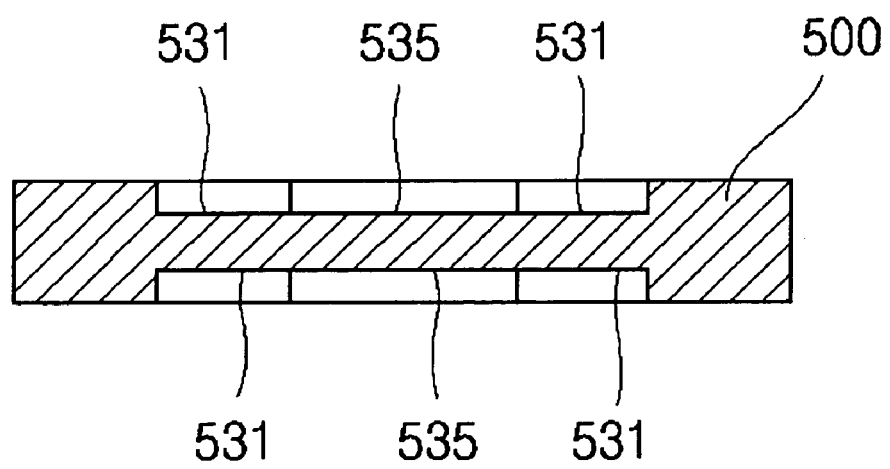
FIG. 3B is a sectional view of the cap plate of FIG. 3A.

Referring to FIGS. 3A and 3B, the cap plate 500 according to one embodiment of the present invention includes a terminal hole 510, an electrolyte injection hole 520 and a safety vent 530.

The safety vent 530 has a substantially constant thickness less than the thickness of the cap plate and includes at least one first directional weak component 531, which is aligned in a longitudinal direction of the cap plate 500, and at least one second directional weak component 535, which is aligned in a lateral direction of the cap plate 500 and connected to the first directional weak component 531. Such a safety vent 530 may be formed in various shapes by combining the first directional weak component with the second directional weak component. In addition, the first and second directional weak components of the safety vent 530 may be formed through a pressing process or a taping process when the cap plate is formed.

For instance, according to the present embodiment, two first directional weak components 531 and one second directional weak component 535 are provided in which both ends of the second directional weak component 535 are connected to center portions of two first directional weak components 531. Thus, the safety vent 530 has an "H" shape.

In addition, the safety vent 530 may have a thickness equal to or less than 0.7 mm. For example, the thickness of the safety vent 530 may be in the range of between about 20 μm to 0.7 mm.

Table 1 shows deformation quantity of the cap plate according to the shape of the safety vent.

TABLE 1

| Shape of safety vent |  |  |
|---|---|---|
| Maximum deformation of cap plate | 1.706 mm | 1.866 mm |
| Material of cap plate | Al3003-H14 | Al3003-H14 |
| Internal pressure of battery | 10 kgf/cm$^2$ | 10 kgf/cm$^2$ |

Figure 4A:
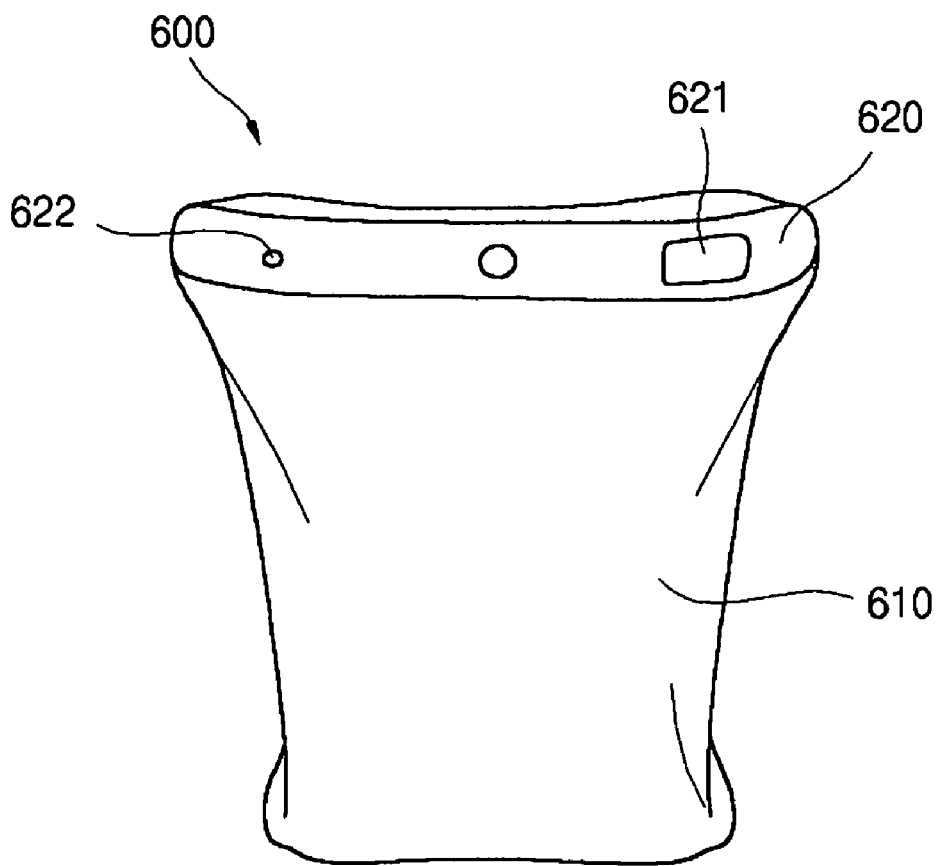
FIG. 4A is a perspective view illustrating a lithium secondary battery which has been deformed due to high internal pressure of the lithium secondary battery.
Figure 4B:
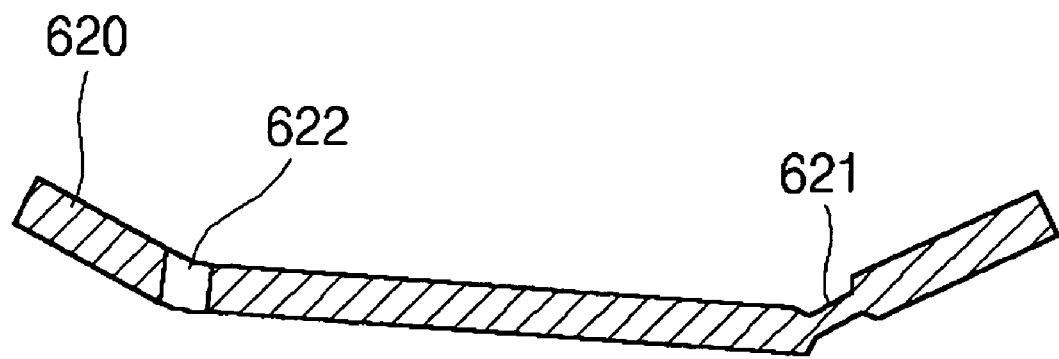
FIG. 4B is a sectional view illustrating a cap plate of a lithium secondary battery which has been deformed due to high internal pressure of the lithium secondary battery.

Referring to FIGS. 4A and 4B, the lithium secondary battery includes a case 610 and a cap plate 620 having an electrolyte injection hole and a safety vent 621. The lithium secondary battery 600 is deformed as the internal pressure of the lithium secondary battery 600 rises. If the internal pressure of the lithium secondary battery 600 rises to a certain level, a predetermined portion of the cap plate 620 corresponding to the safety vent 621 may become significantly deformed. As a result of the increased pressure, the safety vent 621 of the cap plate 620 fractures, thereby preventing accidental explosion of the lithium secondary battery 600.

In addition, referring to Table 1, the maximum deformation of the cap plate may vary depending on the shape of the safety vent 621 of the cap plate 620. The maximum deformation of a cap plate having an H-shaped safety vent 620 is larger than that of a cap plate having a rectangular-shaped safety vent. Thus, if the safety vent 620 has an H-shape, the safety vent 620 may be fractured under a relatively low internal pressure of the lithium secondary battery 600.

Referring to FIGS. 5A to 5D, the cap plate 700 includes an electrolyte injection hole 720 and a safety vent 730. The safety vent 730 according to one embodiment of the present invention includes at least one first directional weak component 731 which is aligned in a longitudinal direction of the cap plate 700, and at least one second directional weak component 735 which is aligned in a lateral direction of the cap plate 700. The safety vent 730 may be formed with various shapes by combining the first directional weak component 731 with the second directional weak component 735. That is, the safety vent 730 may have an H-shape, a T-shape, an I-shape, a II-shape, or a III-shape.

Figure 5A:
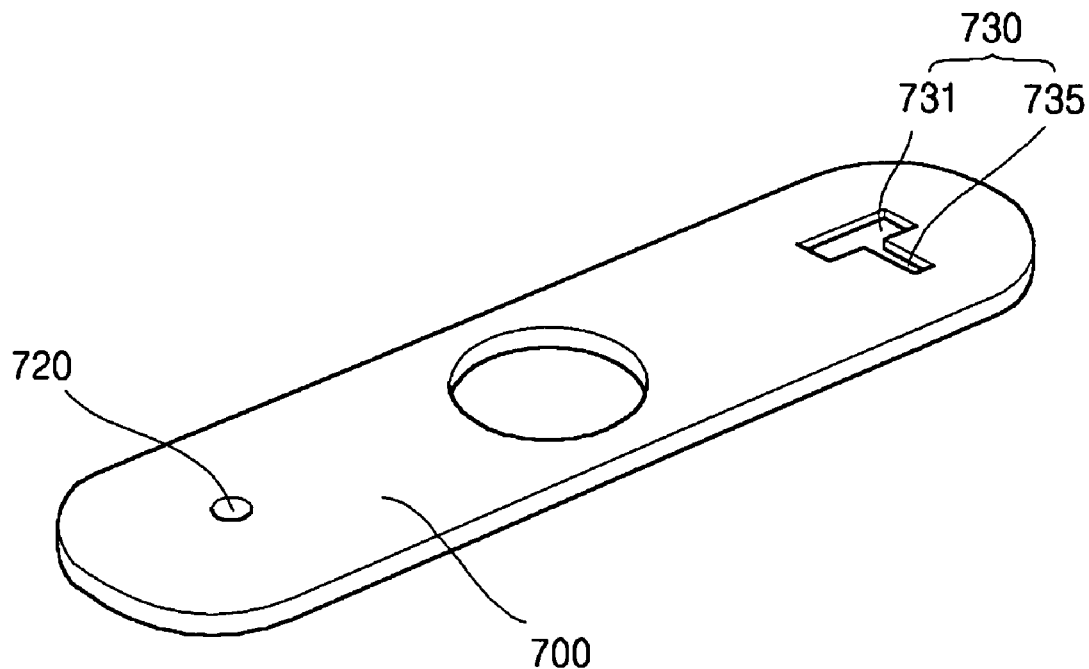
FIGS. 5A, 5B, 5C and 5D are perspective views illustrating various safety vents formed in a cap plate of a lithium secondary battery according to one embodiment of the present invention.
Figure 5B:
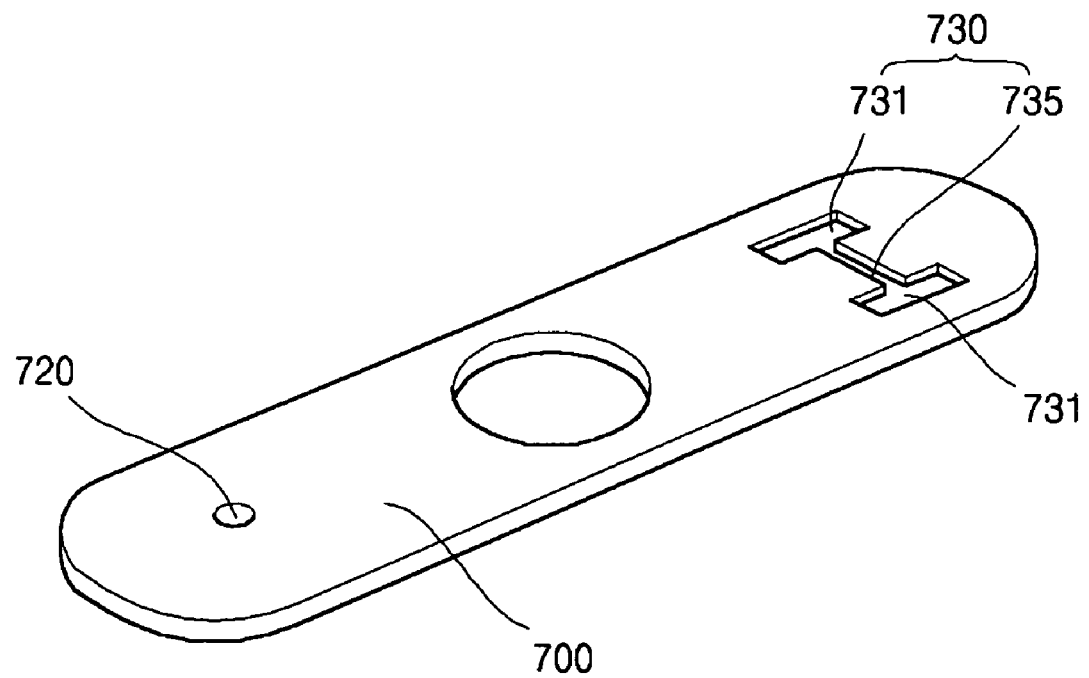

For example, as shown in FIG. 5B, the safety vent 730 may include two first directional weak components 731 and one second directional weak component 735, in which the two first directional weak components 731 are aligned parallel to each other and the second directional weak component 735 is aligned perpendicularly to the first directional weak components 731.

If the length of the first directional weak component 731 is longer than the length of the second directional weak component 735, the safety vent 730 is formed with an H-shape. In contrast, if the length of the second directional weak component 735 is longer than the length of the first directional weak component 731, the safety vent 730 is formed with an I-shape.

Figure 5C:
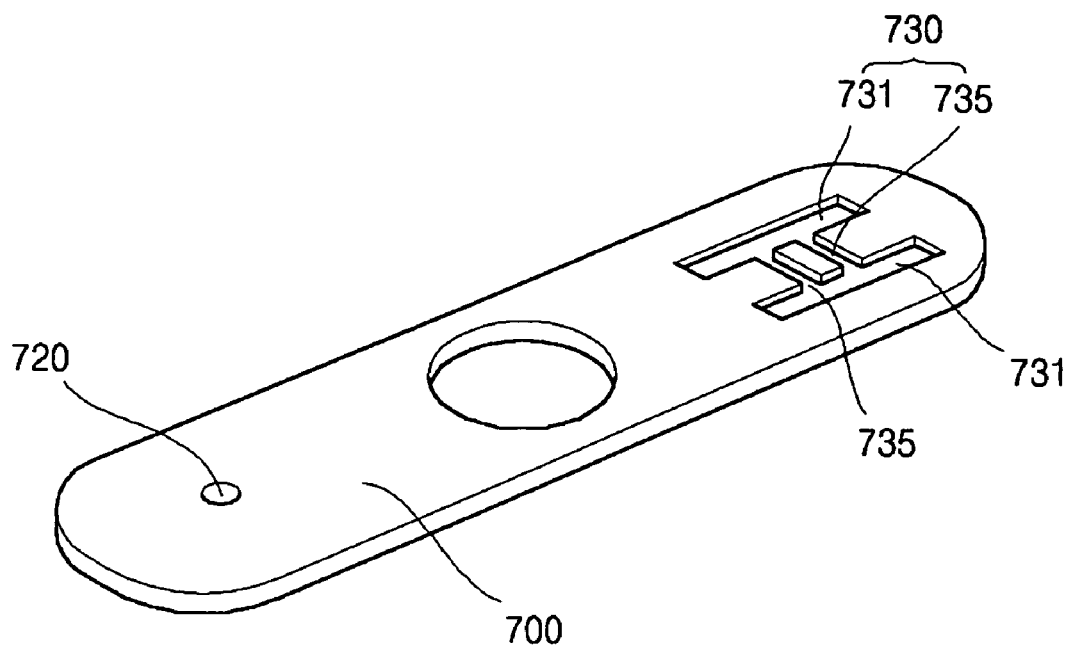

In addition, as shown in FIG. 5C, the safety vent 730 may include two first directional weak components 731 and two second directional weak components 735, in which both ends of the two second directional weak components 735 are connected to portions of the two first directional weak components 731. In this case, the safety vent 730 is formed with a II-shape.

Figure 5D:
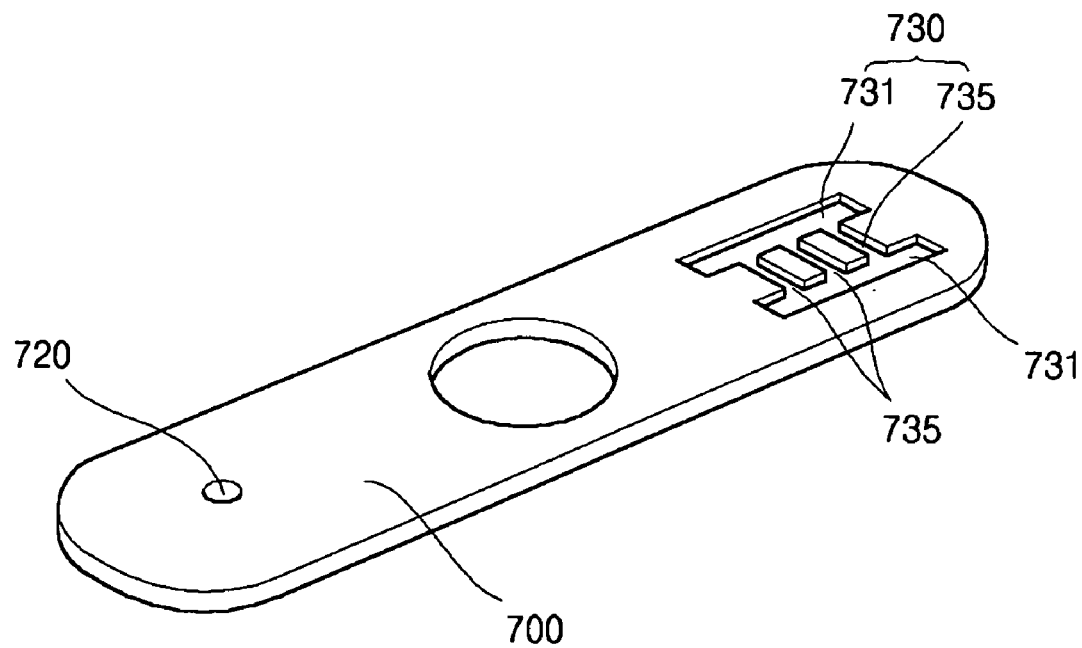

Furthermore, as shown in FIG. 5D, the safety vent 730 may include two first directional weak components 731 and three second directional weak components 735, in which both ends of the three second directional weak components 735 are connected to portions of the two first directional weak components 731. In this case, the safety vent 730 is formed with a III-shape.

As described above, the cap plate of the lithium secondary battery according to the present invention may have a safety vent including at least one first directional weak component aligned in the longitudinal direction of the cap plate and at least one second directional weak component aligned in the lateral direction of the cap plate. In addition, the second directional weak component is connected to the first directional weak component so that the safety vent may be easily fractured when the internal pressure of the lithium secondary battery suddenly rises.

Since the safety vent may be fractured under the relatively low internal pressure of the lithium secondary battery, the safety of the lithium secondary battery is improved.

In addition, since the safety vent may be fractured under the relatively low internal pressure of the lithium secondary battery, it is possible to obtain the safety vent having a relatively large thickness. In this case, the lithium secondary battery represents superior endurance against external impact (for example, when the lithium secondary battery is dropped), so that the safety and reliability of the lithium secondary battery may be further improved.

According to the present invention, the shape of the safety vent of the cap plate is modified such that the safety vent may be easily fractured under the low breakage pressure even if the safety vent has a relatively large thickness, thereby improving the reliability and safety of the cap assembly and the lithium secondary battery with the same.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A cap assembly for a secondary battery comprising a cap plate having a thickness, the cap assembly comprising:
a safety vent having a substantially constant thickness less than the thickness of the cap plate, the safety vent being adapted to fracture upon the secondary battery reaching a predetermined internal pressure and comprising at least one first weak component aligned in a first direction and at least one second weak component aligned in a second direction, wherein one end of the at least one second weak component is connected to a central portion of the at least one first weak component.

2. The cap assembly as claimed in claim 1, wherein the safety vent has a shape selected from an H-shape, a T-shape, an I-shape, a II-shape and a III-shape.

3. The cap assembly as claimed in claim 1, wherein the at least one first weak component is aligned in a longitudinal direction of the cap plate and the least one second weak component is aligned in a lateral direction of the cap plate.

4. The cap assembly as claimed in claim 1, wherein two ends of at least one of the second weak components are connected to central portions of at least two first weak components of the safety vent.

5. The cap assembly as claimed in claim 4, wherein the at least one first weak component is longer than the at least one second weak component.

6. The cap assembly as claimed in claim 4, wherein the at least one second weak component is longer than the at least one first weak component.

7. The cap assembly as claimed in claim 1, wherein the substantially constant thickness of the safety vent is between about 20 μm to 0.7 mm.

8. A lithium secondary battery comprising:
- a roll-type electrode assembly comprising a first electrode plate, a second electrode plate and a separator between the first electrode plate and the second electrode plate;
- a case having a cavity for receiving the roll-type electrode assembly; and
- a cap assembly comprising a cap plate having a thickness and comprising a safety vent having a substantially constant thickness less than the thickness of the cap plate and adapted to fracture upon the secondary battery reaching a predetermined internal pressure, the safety vent comprising at least one first weak component aligned in a first direction and at least one second weak component aligned in a second direction, one end of the at least one second weak component connected to a central portion of the at least one first weak component,
- wherein the cap assembly is assembled with the case to seal the case and provides access for a terminal unit to be electrically connected to the roll-type electrode assembly.

9. The lithium secondary battery as claimed in claim 8, wherein the safety vent has a shape selected from an H-shape, a T-shape, an I-shape, a II-shape and a III-shape.

10. The lithium secondary battery as claimed in claim 8, wherein the at least one first weak component is aligned in a longitudinal direction of the cap plate and the at least one second weak component is aligned in a lateral direction of the cap plate.

11. The lithium secondary battery as claimed in claim 10, wherein the at least one first weak component is longer than the at least one second weak component.

12. The lithium secondary battery as claimed in claim 9, wherein the substantially constant thickness of the safety vent is between about 20 μm to 0.7 mm.

* * * * *

UNITED STATES PATENT AND TRADEMARK OFFICE
CERTIFICATE OF CORRECTION

PATENT NO. : 7,648,794 B2
APPLICATION NO. : 11/234831
DATED : January 19, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1141 days.

Signed and Sealed this

Twenty-eighth Day of December, 2010

David J. Kappos
*Director of the United States Patent and Trademark Office*